No. 663,104. Patented Dec. 4, 1900.
H. C. P. SIVERSLETH.
INDIA RUBBER TIRE FOR VEHICLES.
(Application filed Jan. 30, 1900.)

(No Model.)

WITNESSES:
Ella L. Giles

INVENTOR
Hans Christian Petersen Siversleth
BY
Richards
ATTORNEYS

THE NORRIS PETERS CO., PHOTO-LITHO., WASHINGTON, D. C.

UNITED STATES PATENT OFFICE.

HANS CHRISTIAN PETERSEN SIVERSLETH, OF COPENHAGEN, DENMARK.

INDIA-RUBBER TIRE FOR VEHICLES.

SPECIFICATION forming part of Letters Patent No. 663,104, dated December 4, 1900.

Application filed January 30, 1900. Serial No. 3,374. (No model.)

*To all whom it may concern:*

Be it known that I, HANS CHRISTIAN PETERSEN SIVERSLETH, a subject of the King of Denmark, and a resident of Copenhagen, Denmark, have invented certain new and useful Improvements in India-Rubber Tires for Vehicles, of which the following is a specification.

To employ india-rubber tires for vehicle-wheels is not new, as this has been used both on the pneumatic and the cushion system. However, the systems in use up till now have all had several inconveniences, of which especially can be named that the tires are only detachable from wheels constructed for that purpose; also, it is impossible to take off the tires and do without them in bad weather or other occasions where this may be desirable.

The present invention has for its object to do away entirely with these inconveniences, and from the following it will be seen that the tire herein described is very easy to put on and just as easy to take off any kind of wheels in use now.

The invention is illustrated on the accompanying drawings, wherein—

Figure 1:
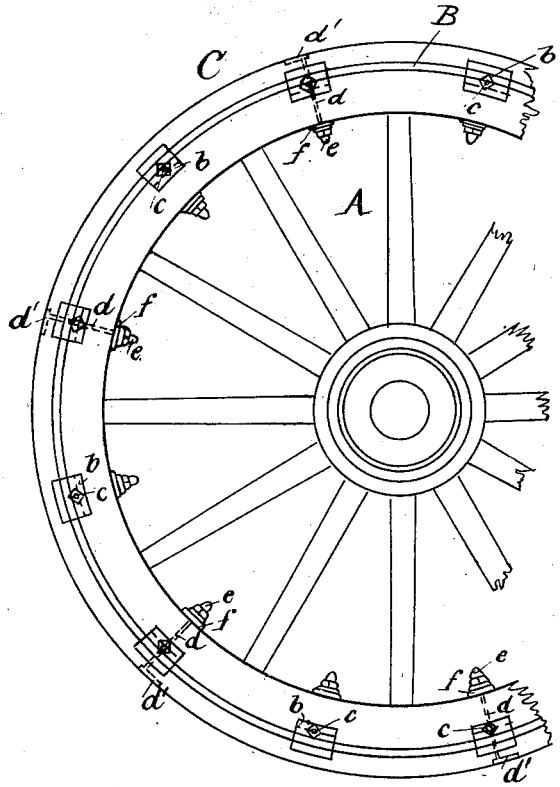
Figure 2:
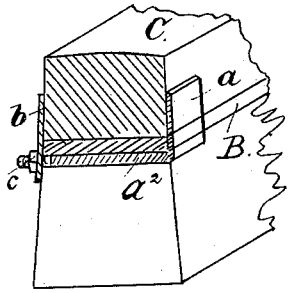
Figure 3:
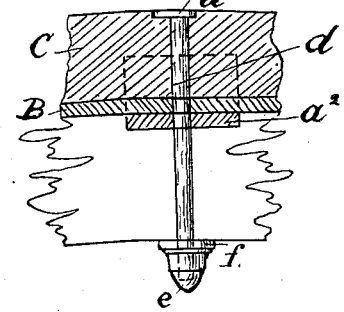
Figures 4, 5:
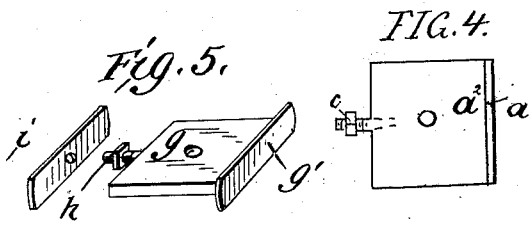

Figure 1 shows a wheel provided with an india-rubber tire in accordance with my invention. Fig. 2 is a section of the wheel provided with a steer-cramp. Fig. 3 shows a combination of the bolt and steer-cramp. Fig. 4 shows the steer-cramp seen from the top Fig. 5 is a stopple.

As shown in Fig. 1, the india-rubber tire C is put on the felly or rim B. Both felly and tire C are provided with a number of holes through which are put the bolts $d$, having the oval heads $d'$, which keep the tire to the rim or felly. Each bolt $d$ is secured by means of the nut $e$, between which and the felly is laid a little rubber plate or washer $f$ to make the bolt springy while driving.

In order to insure that the tire C when used for heavy vehicles shall not get out of place, the rim is provided with another series of holes for the steer-cramp $a$. (See Figs. 2 and 4.) This steer-cramp is fixed to the wheel by letting its paddle $a^2$, Fig. 2, pass through corresponding holes in the rim. The paddle $a^2$ ends in a turn, over which the corresponding wall $b$ of the steer-cramp is put and kept in place by the nut $c$. For lighter vehicles it may be sufficient to fix the tire C by means of this steer-cramp $a$ alone. On wheels for very light driving the tire C can be kept on by aid of the bolts $d$ alone. If desired, these latter can be in combination with the steer-cramps $a$, so the bolt will go through both, this combination being illustrated in Fig. 3, and it may be noted that the steer-cramp is fixed to the rim in the same way as before described.

From the foregoing it will be seen that to provide wheels with india-rubber tires after my system will be very inexpensive in comparison with the systems now in use; as no specially-constructed rims are required. Finally it will be noted that when the india-rubber tire for any reason is to be used the holes in the rim can be stopped by means of the stopple $g$, Fig. 5, the head $g'$ covering the one side, while another plate $i$ correspondingly will be put on the other side, kept close over the hole by means of the nut $h$.

Having now particularly described and ascertained the nature of my said invention and in what manner the same is to be performed, I declare that what I claim is—

In a vehicle-wheel, the combination with the felly or rim of a rubber tire encircling the same, cramps seated in said felly for holding the tire against lateral displacement and headed bolts passing radially through the felly, cramps, and tire, substantially as described.

In witness whereof I have hereunto set my hand in presence of two witnesses.

HANS CHRISTIAN PETERSEN SIVERSLETH.

Witnesses:
CHR. P. P. SIVERSLETH,
A. FORMANN.